United States Patent
Suzuki et al.

[11] Patent Number: 6,062,999
[45] Date of Patent: May 16, 2000

[54] BACKLASHLESS RATCHET-TYPE TENSIONER

[75] Inventors: Tadasu Suzuki, Tokyo-to; Junya Kurohata, Saitama-ken, both of Japan

[73] Assignee: Tsubakimoto Chain Co., Osaka, Japan

[21] Appl. No.: 09/188,798

[22] Filed: Nov. 9, 1998

[51] Int. Cl.[7] ...................................................... F16H 7/08
[52] U.S. Cl. .......................................... 474/111; 474/136
[58] Field of Search ................................... 474/101, 111, 474/136, 138

[56] References Cited

U.S. PATENT DOCUMENTS

| | | | |
|---|---|---|---|
| 4,822,320 | 4/1989 | Suzuki | 474/111 |
| 5,006,095 | 4/1991 | Suzuki | 474/111 |
| 5,184,982 | 2/1993 | Shimaya et al. | 474/101 |

FOREIGN PATENT DOCUMENTS

| | | |
|---|---|---|
| 0195945 | 10/1986 | European Pat. Off. . |
| 1387094 | 3/1975 | United Kingdom . |

Primary Examiner—Thomas R. Hannon
Attorney, Agent, or Firm—Dann, Dorfman, Herrell and Skillman, P.C.; Henry H. Skillman

[57] ABSTRACT

A backlashless ratchet-type tensioner includes a tensioner housing, a plunger slidably fitted into a plunger accommodation bore formed in the tensioner housing and urged by a spring such that a tip portion of the plunger is projected to the exterior of the plunger accommodation bore, and a ratchet pivotally supported on a ratchet pin provided on the tensioner housing. At least one ratchet pawl formed on the ratchet is meshed with rack teeth formed on an outer surface of the plunger so as to prevent the plunger from receding into the plunger accommodation bore. A front face of the ratchet pawl is formed substantially perpendicular to a straight line which passes through a tip of the ratchet pawl and the center of the ratchet pin. The angle between a plane perpendicular to the axis of the plunger and the front face of the ratchet pawl meshed with a rack tooth is slightly smaller than the angle between the plane perpendicular to the axis of the plunger and a rear face of the rack tooth. When the ratchet pawl comes into engagement with a rack tooth, the tip end of the ratchet pawl pushes the rear face of the rack tooth to slightly advance the plunger and hold it in a backlash-eliminated state.

5 Claims, 5 Drawing Sheets

6,062,999

BACKLASHLESS RATCHET-TYPE TENSIONER

BACKGROUND OF THE INVENTION

1. Field of the Invention

The present invention relates to a ratchet-type tensioner for applying an appropriate tension to a timing chain of a vehicle engine or to a like device. More particularly, the invention relates to a mechanism for eliminating backlash of a plunger used in a ratchet-type tensioner.

2. Description of the Related Art

Conventionally, a ratchet-type tensioner as shown in FIG. 3 is used with a chain drive for transmitting rotational motion from the crankshaft to the cam shaft of an engine. The tensioner is adapted to apply an appropriate tension to the slack side of a timing belt or timing chain to thereby suppress vibration which would otherwise occur on the timing belt or timing chain when the belt or chain travels.

In FIG. 3, a ratchet-type tensioner A1 is mounted on an engine body on the slack side of a chain A6 (timing chain). The chain A6 is fitted around and extends between a driving sprocket A3 rotated by a crankshaft A2 of an engine and a driven sprocket A5 fixed on a cam shaft A4.

In the ratchet-type tensioner A1, a plunger A8 projects from the front face of a tensioner housing A7 such that it can undergo reciprocating motion. A tip F of the plunger 8 presses the rear side of a tension lever A10 at a position near the free end of the tension lever A10. The tension lever A10 is pivotally supported on an engine body by means of a support shaft A9. Through such arrangement, a shoe surface A11 of the tension lever A10 is brought into slidable contact with the slack side of the chain A6 to thereby apply tension to the chain A6.

The tensioner housing A7 has a plunger accommodation bore A12 formed therein. The plunger A8 is fitted into the bore A12 such that it may undergo reciprocating motion.

The plunger A8 has a hollow portion A13 formed therein. The hollow portion A13 opens to the end surface of the plunger A8 which faces the bottom of the plunger accommodation bore A12. A plunger spring A14 is inserted into the hollow portion A13 and disposed between the bottom of the plunger accommodation bore A12 and that of the hollow portion A13, thereby urging the plunger A8 at all times in such a direction that the plunger A8 is projected from the tensioner housing A7.

A ratchet A16 is pivotally supported on the tensioner housing A7 by means of a ratchet pin A15. As shown in FIG. 4, the ratchet A16 has ratchet pawls A17 and A18 which mesh with rack teeth T formed on an outer surface of the plunger A8.

A ratchet spring A19, which is disposed between the tensioner housing A7 and the ratchet A16, urges the ratchet A16 to rotate about the ratchet pin A15 so that the ratchet pawls A17 and A18 are in engagement with the rack teeth T at all times. Through engagement between the ratchet pawls A17 and A18 and the rack teeth T, the plunger A8 is prevented from moving in a receding direction (to the left in FIG. 3).

In the tensioner A1, when the tension of the chain A6 of FIG. 3 is high, the plunger A8 held at a position depicted with a solid line in FIG. 4 gradually projects beyond the position depicted with the solid line of FIG. 4 as the chain A6 elongates. Following the projection of the plunger A8, the ratchet A16 rotates counterclockwise about the ratchet pin A15 as shown in FIG. 4.

At this time, the fronts-side ratchet pawl A18, which has meshed with a rack tooth T, leaves the rack tooth T, and only the rears-side ratchet pawl A17 is in contact with the rack tooth T. Subsequently, when the plunger A8 projects further until the tip F advances over a distance d, the ratchet pawl A17 disengages the rack tooth T. As a result, the ratchet A16 rotates clockwise due to a force applied to the ratchet A16 by the ratchet spring A19.

Subsequently, when, as a result of the tension of the chain A6 increasing again due to an increase in the distance between the axes of the sprockets A3 and A5 caused by thermal expansion, the tension lever A10 presses the tip F of the plunger A8 located at a position depicted with broken lines in FIGS. 4 and 5, i.e., at a position reached through projection over the distance d in FIG. 4, the plunger A8 can slightly recede in an amount of a backlash b FIG. 5, or over the distance between the tip F depicted with the broken line and the tip F depicted with a solid line in FIG. 5.

A path C of movement of the tip of the ratchet pawl A17 interferes with a rack tooth T depicted with the solid line in FIG. 5. Thus, in order for the plunger A8 to move from the position depicted with the solid line in FIG. 4 to the position depicted with the solid line in FIG. 5, i.e., to advance in an amount corresponding to the pitch of the rack teeth T, the plunger A8 must advance the distance d, which is longer than the rack tooth pitch. Otherwise, the ratchet pawl A17 cannot pass the interfering range. Thus, the backlash b equals the difference between the distance d and the array pitch of the rack teeth T.

The presence of the backlash b prevents howling which would otherwise occur during chain operation due to an excessive tension of the chain A6, which is produced when the distance between the axis of the crankshaft A2 and the axis of the cam shaft A4 increases due to thermal expansion. Notably, Japanese Patent Publication No. 3-8415 discloses a ratchet-type tensioner having an intentionally increased backlash.

However, with a recent technological innovation in chains, silent chains tend to be used as timing chains for vehicle use. Thus, even when a chain tension becomes excessively large, a silent chain hardly generates howling. By contrast, at present, noise derived from vibration of a running chain is rather a problem. Noise derived from chain vibration tends to increase with plunger backlash.

To cope with the noise problem, in many ratchet-type tensioners, oil is introduced via a check valve into an internal space defined by a tensioner housing and a plunger. When an impact force acts on the plunger from a chain, the impact force is hydraulically damped to thereby suppress chain vibration. However, incorporation of the check valve into the tensioner housing causes an increase in tensioner size as well as structural complication, resulting in an increase in manufacturing cost.

SUMMARY OF THE INVENTION

An object of the present invention is to solve the above-mentioned problems involved in conventional ratchet-type tensioners, and to provide a ratchet-type tensioner which can reduce noise derived from chain vibration through elimination of plunger backlash and which features simple structure and low manufacturing cost.

To achieve the above object, the present invention provides a backlashless ratchet-type tensioner comprising a tensioner housing, a plunger, and a ratchet. The plunger is slidably fitted into a plunger accommodation bore formed in the tensioner housing and is urged by a spring such that a tip portion of the plunger is projected to the exterior of the plunger accommodation bore. The ratchet is pivotally supported on a ratchet pin provided on the tensioner housing. A ratchet pawl formed on the ratchet is meshed with rack teeth formed on an outer surface of the plunger so as to prevent the plunger from receding into the plunger accommodation bore. A front face of the ratchet pawl located on the near side with respect to the tip portion of the plunger is formed substantially perpendicular to a straight line which passes through the tip of the ratchet pawl and the center of the ratchet pin. The angle between a plane perpendicular to the axis of the plunger and the front face of the ratchet pawl meshed with the rack tooth is slightly smaller than the angle between the plane perpendicular to the axis of the plunger and a rear face of the rack tooth.

In this specification, the terms "front" and "rear" are used with respect to the projecting direction of the plunger of the tensioner.

The plunger is urged by the spring in a projecting direction relative to the tensioner housing and applies an appropriate tension to the slack side of a chain, thereby preventing the slack and vibration of the chain during chain operation. As the chain elongates with time, the spring-urged plunger advances gradually. As a result, the front face of a rear-side rack tooth adjacent to the rack tooth with which the ratchet pawl has meshed presses the ratchet pawl upward, so that the ratchet rotates about the ratchet pin. When the tip of the ratchet pawl passes over the tip of the rear-side rack tooth, the ratchet rotates in a meshing direction, whereby the front face of the ratchet pawl meshes with the rear face of the rear-side rack tooth. That is, the plunger advances by a distance corresponding to the pitch of the rack teeth and is held thereat.

Since the front face of the ratchet pawl is formed substantially perpendicular to a straight line which passes through the tip of the ratchet pawl and the center of the ratchet pin, the front face of the ratchet pawl moves toward the rear-face side of a rack, while substantially tracing the path of rotation of the tip of the ratchet pawl.

Also, since the angle between a plane perpendicular to the axis of the plunger and the front face of the ratchet pawl meshed with a rack tooth is slightly smaller than the angle between the plane perpendicular to the axis of the plunger and the rear face of the rack tooth, no interference exists between the front face of the ratchet pawl and the rear face of the rack tooth. Also, when the ratchet pawl meshes with the rack tooth, the tip of the ratchet pawl presses the rear face of the rack tooth, thereby slightly advancing the plunger and holding the plunger thereat. Thus, no backlash occurs in the plunger.

Therefore, according to the present invention, plunger backlash can be eliminated, so that there can be reduced noise that is generated due to vibration of a traveling chain.

In many conventional tensioners involving plunger backlash, in order to prevent chain vibration derived from axial play of a plunger during chain operation, oil is introduced via a check valve into an internal space defined by a tensioner housing and a plunger so as to hydraulically suppress plunger vibration. By contrast, according to the present invention, no check valve is incorporated into the tensioner housing, thereby reducing the size and weight of the tensioner as well as manufacturing cost.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIGS. 1 and 1A are schematic sectional views of a main portion of a ratchet-type tensioner according to an embodiment of the present invention, illustrating displacements of a plunger and a ratchet when the plunger is projected;

FIGS. 2 and 2A are schematic sectional views of the main portion of the ratchet-type tensioner according to the embodiment, illustrating displacements of the plunger and the ratchet when ratchet pawls are to mesh with rack teeth;

DESCRIPTION OF THE PREFERRED EMBODIMENT

Figure 1:
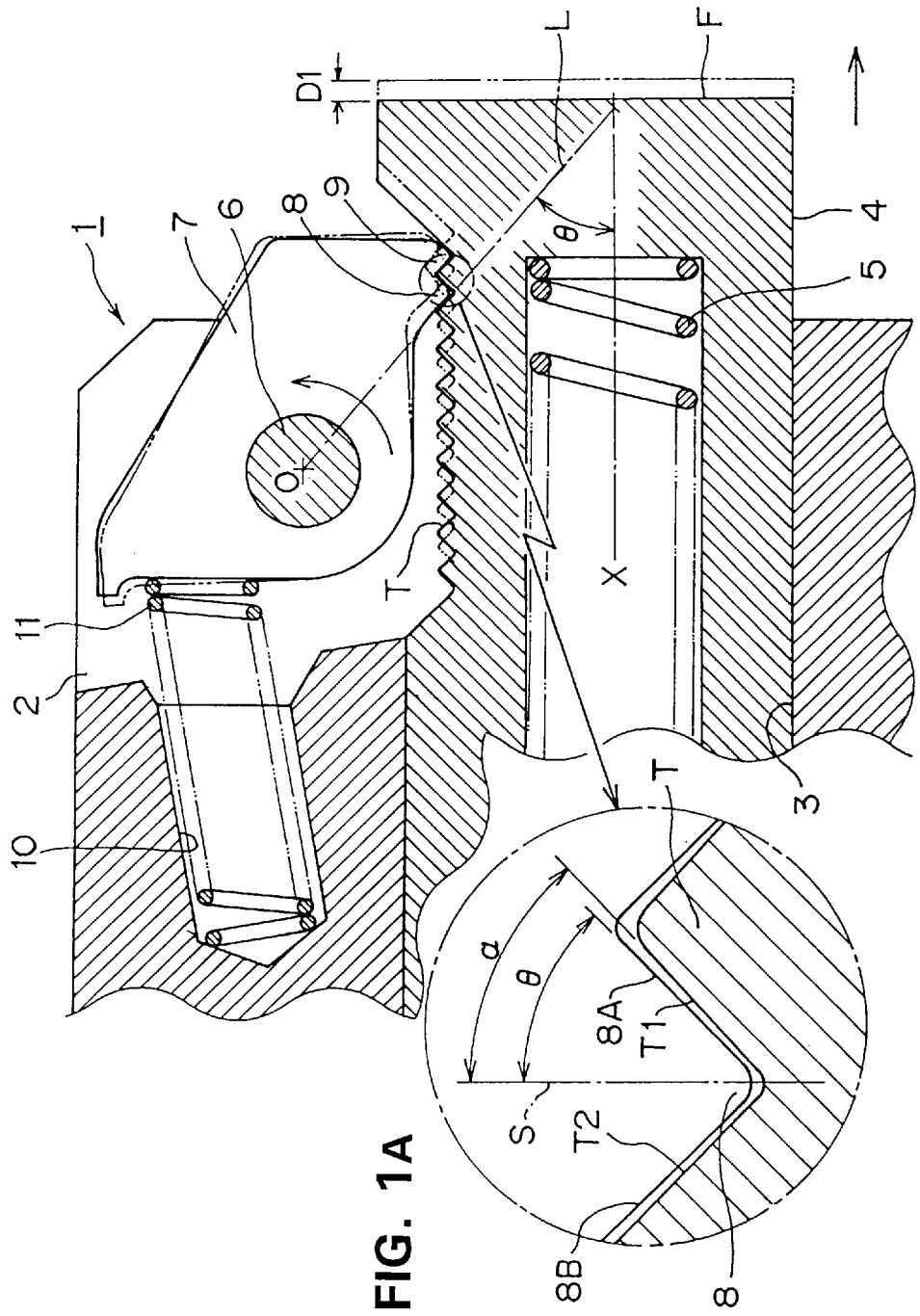

An embodiment of the present invention will next be described with reference to the drawings. FIG. 1 shows a main portion of a ratchet-type tensioner 1 according to the embodiment. As in the case of conventional tensioners of this kind, the ratchet-type tensioner 1 (hereinafter, referred to simply as the tensioner 1) includes a plunger 4. The plunger 4 is slidably fitted into a plunger accommodation bore 3 which is formed in a tensioner housing 2 and opens onto the exterior of the tensioner housing 2.

The plunger 4 is urged by a plunger spring 5 at all times in such a direction that a tip F is projected from the tensioner housing 2 to the exterior of the tensioner housing 2. The tip F presses the rear surface of an unillustrated tensioner lever so as to apply tension to a chain via the tensioner lever.

A ratchet 7 is supported on the tensioner housing 2 in such a manner as to be rotatable about a ratchet pin 6. Two ratchet pawls 8 and 9 are urged by a ratchet spring 11 against a number of rack teeth T formed in the side surface of the plunger 4, thereby preventing the plunger 4 from receding. The ratchet spring 11 is held in a spring accommodation bore 10 formed in the tensioner housing 2.

As shown in FIG. 1, in the tensioner 1 of the present invention, a front face 8A of the ratchet pawl 8 is formed substantially perpendicular to a straight line L which passes through the tip of the ratchet pawl 8 and a ratchet pin center O.

Not illustrated in detail, but the front face of the front-side ratchet pawl 9 is also formed substantially perpendicular to a straight line which passes through the tip of the ratchet pawl 9 and the ratchet pin center O.

Also, while the ratchet pawl 8 is meshed with a ratchet tooth T, an angle θ between an axis X of the plunger 4 and the straight line L, i.e., an angle θ between the front face 68A of the ratchet pawl 8 and a plane S perpendicular to the plunger axis X, is slightly smaller than an angle α between a rear face T1 of the ratchet tooth T and the plane S. The practical angles θ and α may be set such that α=45°±15° and α−θ=2° to 3°.

Not illustrated in detail, but the ratchet pawl 9 is also formed in a manner similar to that of the ratchet pawl 8.

In the tensioner 1 having the above structure, at the beginning when the tension of an unillustrated chain is high, the ratchet pawls 8 and 9 are completely meshed with the corresponding rack teeth T formed in the plunger 4, thereby preventing the plunger 4 from receding.

Then, as chain tension decreases due to wear-induced elongation of the chain, the plunger 4 is urged by the plunger spring 5 to advance. Accordingly, a rear face 8B of the rear-side ratchet pawl 8 is pressed by a front face T2 of a ratchet tooth T. As a result, the ratchet 7 rotates counter-clockwise in FIG. 1 about the ratchet pin 6, so that the front-side ratchet pawl 9 is disengaged from the corresponding rack tooth T.

Before the plunger 4 advances over a distance D1 to a position depicted with an imaginary line in FIG. 1, the plunger 4 can recede up to a position depicted with a solid line upon increase in chain tension.

When the plunger 4 further advances beyond the distance D1, the rear-side ratchet pawl 8 is disengaged from the tip of the corresponding rack tooth T with which the ratchet pawl 8 has been meshed.

Figure 2:
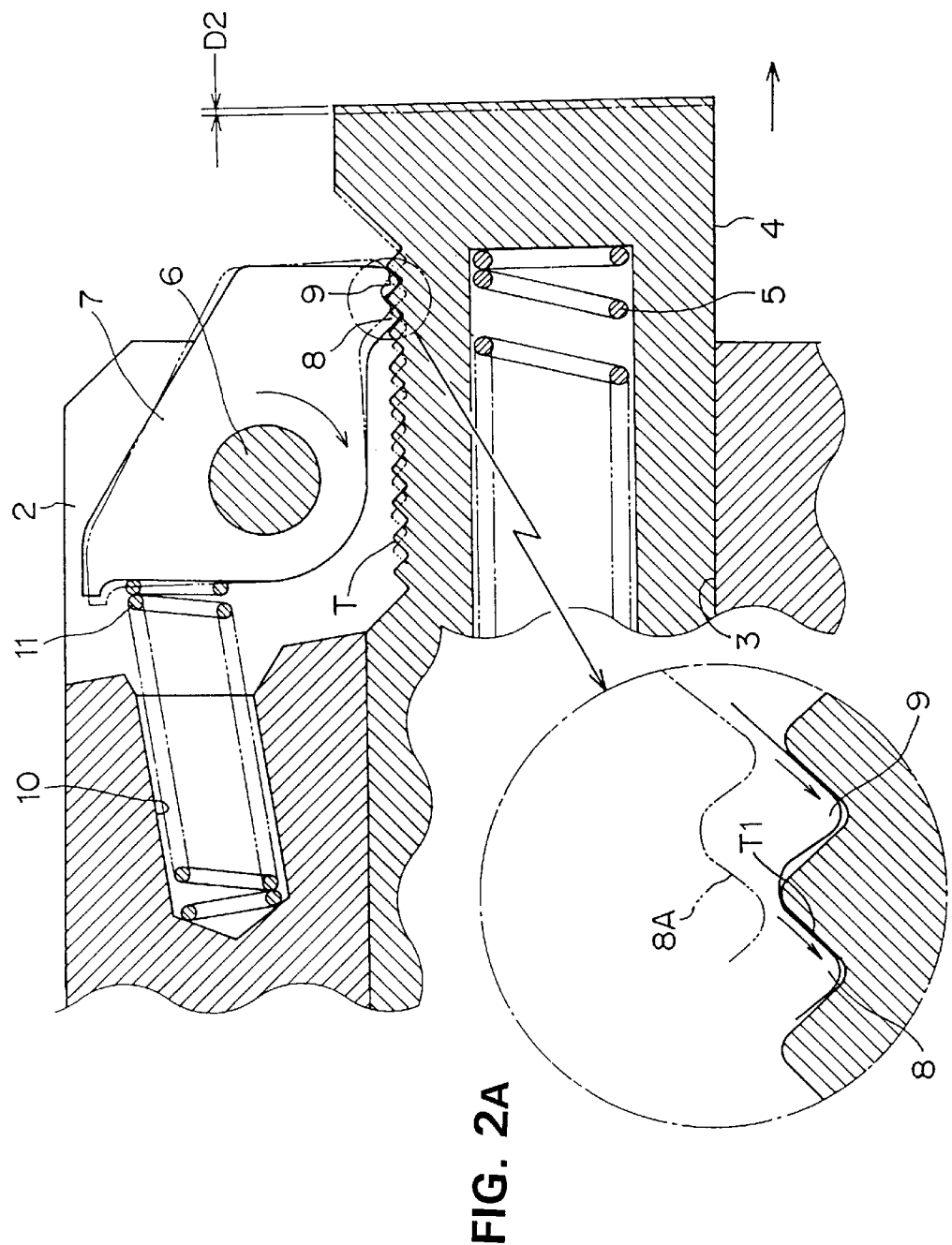
Figure 3:
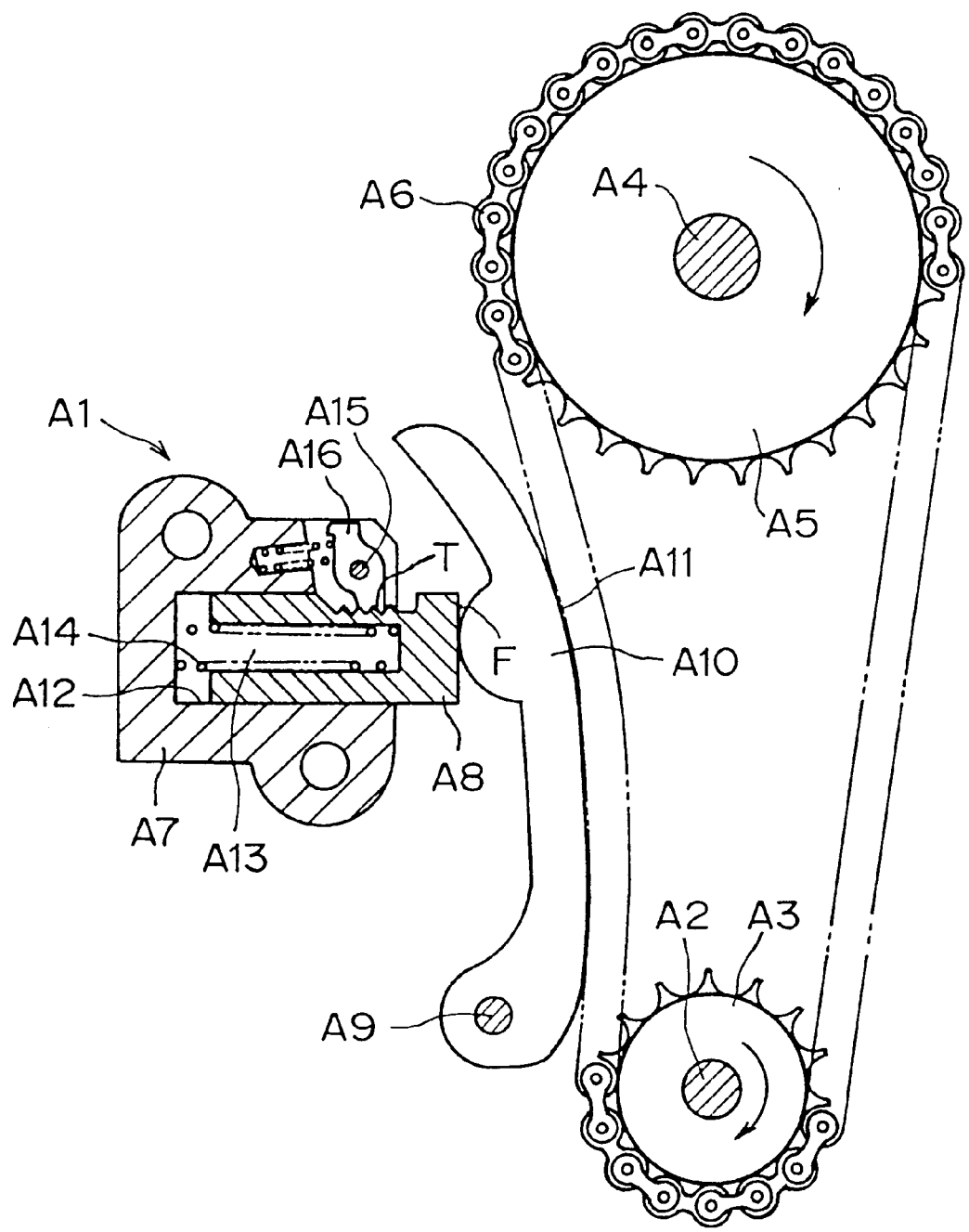
FIG. 3 is a sectional view of a conventional ratchet-type tensioner.
Figure 4:
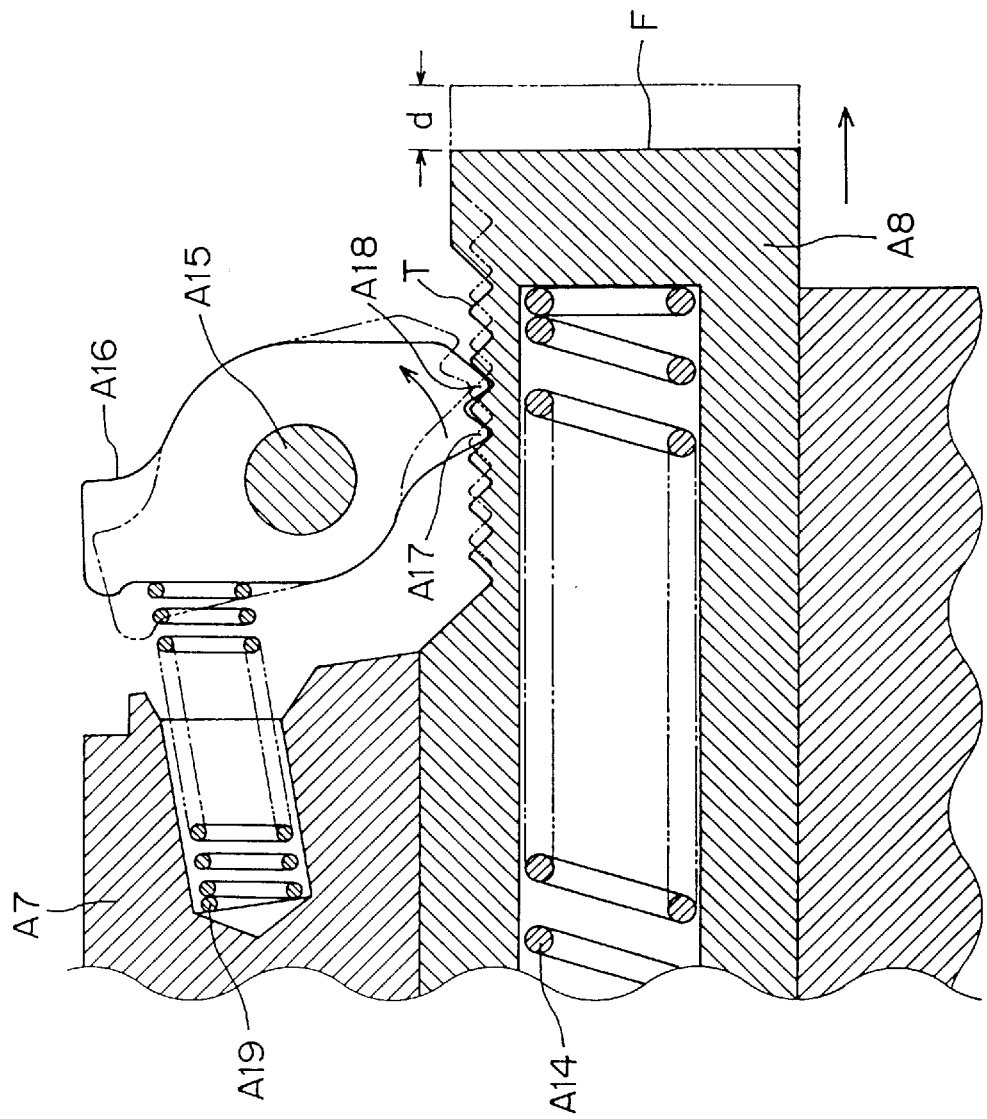
FIG. 4 is a schematic sectional view of a main portion of the conventional ratchet-type tensioner, illustrating displacements of a plunger and a ratchet when the plunger is projected.
Figures 5, 5A:
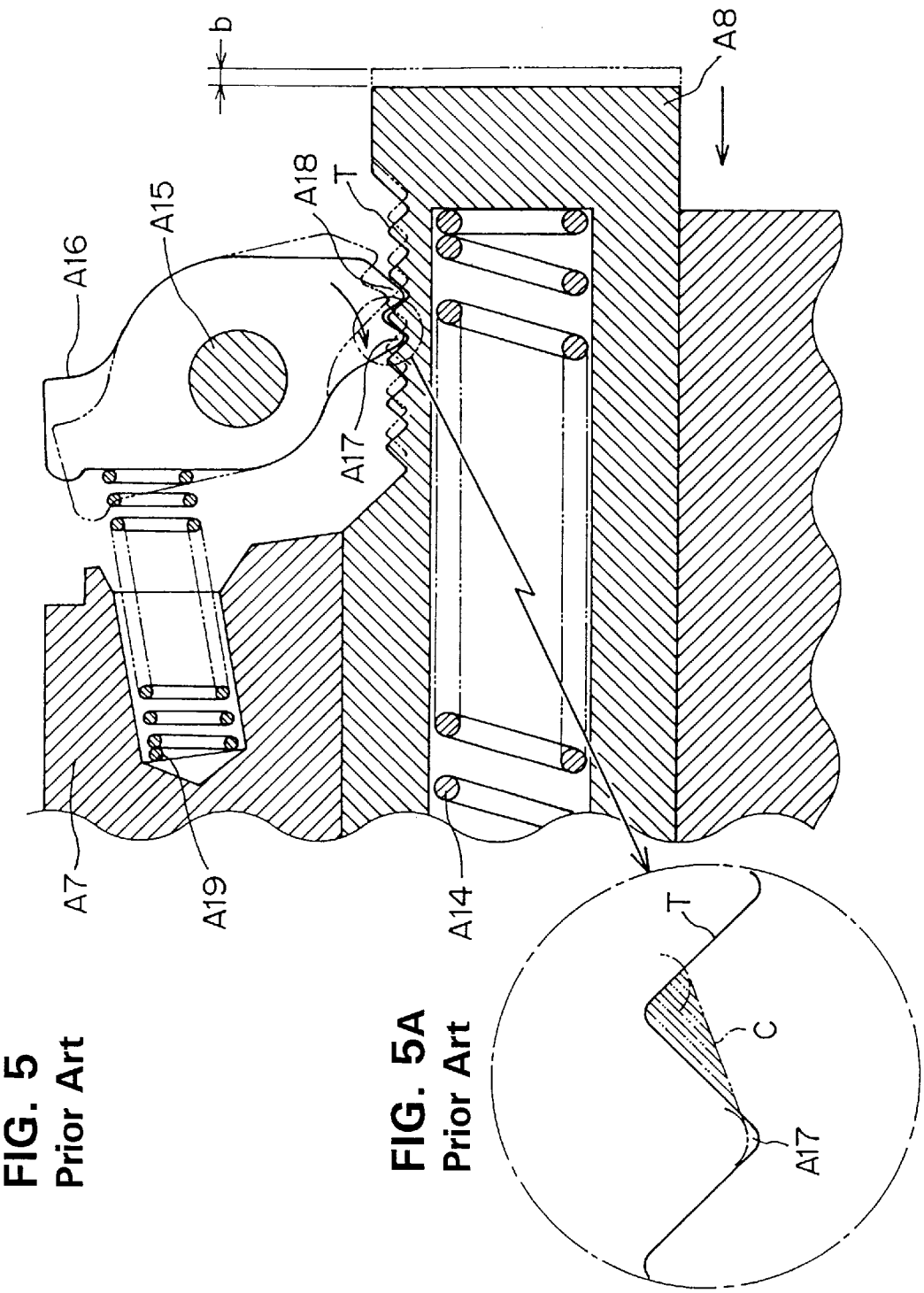
FIGS. 5 and 5A are schematic sectional views of the main portion of the conventional ratchet-type tensioner, illustrating displacements of the plunger and the ratchet when ratchet pawls are to mesh with rack teeth.

As a result, as shown in FIG. 2, the ratchet 7 is urged by the ratchet spring 11 to rotate clockwise about the ratchet pin 6. Consequently, the tip of the rear-side ratchet pawl 8 slides on the rear face T1 of the rack tooth T with which the ratchet pawl 8 was meshed. When the ratchet 7 rotates to a position depicted with a solid line in FIG. 2, the two ratchet pawls 8 and 9 are completely meshed with the corresponding rack teeth T.

At this time, since the angle θ is slightly smaller than the angle α as shown in FIG. 1, the tip of the ratchet pawl 8 presses the rear face T1 of the rack tooth T during the tip sliding on the rear face T1. As a result, the plunger 4 slightly advances further over a slight distance D2 shown in FIG. 2 beyond the position depicted with the imaginary line in FIG. 1. At a new position reached through the slight advancement, the ratchet pawls 8 and 9 are completely meshed with the corresponding rack teeth T, whereby the plunger 4 is held free of backlash.

In the above-described embodiment, the ratchet 7 has two ratchet pawls 8 and 9. However, the number of ratchet pawls may be one or more than two so long as, in the case of a plurality of ratchet pawls, the front face of each ratchet pawl is formed substantially perpendicular to a straight line which passes through the tip of the ratchet pawl and the ratchet pin center, and the angle between the front face of each ratchet pawl meshed with the corresponding rack tooth and a plane perpendicular to the plunger axis is slightly smaller than the angle between the rear face of the corresponding rack tooth and the plane perpendicular to the plunger axis.

Obviously, numerous modifications and variations of the present invention are possible in light of the above teachings. It is therefore to be understood that within the scope of the appended claims, the present invention may be practiced otherwise than as specifically described herein.

What is claimed is:

1. A backlashless ratchet-type tensioner, comprising:

a tensioner housing;

a plunger slidably fitted into a plunger accommodation bore formed in said tensioner housing and urged by a spring such that a tip portion of said plunger is projected to the exterior of said plunger accommodation bore; and a ratchet pivotally supported on a ratchet pin provided on said tensioner housing;

said tensioner being configured such that a ratchet pawl formed on said ratchet is meshed with rack teeth formed on an outer surface of said plunger so as to prevent said plunger from receding into the plunger accommodation bore;

wherein a front face of the ratchet pawl is formed substantially perpendicular to a straight line which passes through a tip of the ratchet pawl and the center of the ratchet pin; and a first angle between a plane perpendicular to an axis of said plunger and the front face of the ratchet pawl meshed with a rack tooth is slightly smaller than a second angle between the plane perpendicular to the axis of the plunger and a rear face of the rack tooth.

2. A backlashless ratchet-type tensioner according to claim 1, wherein said first angle is 45±15°, and said second angle is smaller than said first angle by 2≧3°.

3. A backlashless ratchet-type tensioner according to claim 1, wherein said first angle is about 45°.

4. A backlashless ratchet-type tensioner, comprising:

a tensioner housing;

a plunger slidably fitted into a plunger accommodation bore formed in said tensioner housing and urged by a spring such that a tip portion of said plunger is projected to the exterior of said plunger accommodation bore; and a ratchet pivotally supported on a ratchet pin provided on said tensioner housing and having at least one ratchet pawl which is meshed with rack teeth formed on an outer surface of said plunger so as to prevent said plunger from receding into the plunger accommodation bore, wherein a front face of said ratchet pawl is formed substantially perpendicular to a straight line which passes through a tip of the ratchet pawl and the center of the ratchet pin;

a first angle between a plane perpendicular to an axis of said plunger and the front face of the ratchet pawl meshed with a rack tooth angle is 30–60°; and a second angle between the plane perpendicular to the axis of the plunger and a rear face of the rack tooth is smaller than said first angle by 2–3°.

5. A backlashless ratchet-type tensioner, comprising:

a tensioner housing, a plunger accommodation bore formed in said tensioner housing, and a spring;

a plunger having a longitudinal axis and slidably fitted into said bore and having rack teeth formed on the outer surface of the plunger, and a tip portion urged by said spring, such that said tip portion of said plunger is projected to the exterior of said plunger accommodation bore; and a ratchet comprising a ratchet pawl pivotally supported on a ratchet pin, said pin having a center provided on said tensioner housing;

said tensioner being configured such that said ratchet pawl has a tip meshed with said rack teeth so as to prevent said plunger from receding into said plunger accommodation bore; wherein said ratchet pawl having a rear face and a front face formed substantially perpendicular to a straight line which passes through said tip of the ratchet pawl and the center of said ratchet pin and adapted to be meshed with a rack tooth; and a first angle between a plane perpendicular to said longitudinal axis of said plunger and said front face of the ratchet pawl, and a second angle between the plane perpendicular to said longitudinal axis of the plunger and said rear face of the rack tooth, said first angle being smaller than said second angle.

\* \* \* \* \*

UNITED STATES PATENT AND TRADEMARK OFFICE
CERTIFICATE OF CORRECTION

PATENT NO. : 6,062,999
DATED : May 16, 2000
INVENTOR(S) : Suzuki et al.

It is certified that error appears in the above-identified patent and that said Letters Patent is hereby corrected as shown below:

ON THE TITLE PAGE:

after "[22] Filed: Nov. 9, 1998" insert:

--[30] Foreign Application Priority Data
Aug. 6, 1998 [JP] Japan.....................223066/1998--

Signed and Sealed this

Sixth Day of March, 2001

Attest:

NICHOLAS P. GODICI

Attesting Officer        Acting Director of the United States Patent and Trademark Office

UNITED STATES PATENT AND TRADEMARK OFFICE
CERTIFICATE OF CORRECTION

PATENT NO. : 6,062,999
DATED : May 16, 2000
INVENTOR(S) : Suzuki et al.

It is certified that error appears in the above-identified patent and that said Letters Patent is hereby corrected as shown below:

Column 5, line 11, "68A" should be --8A--;

Column 6, line 42, "2≥" should be --2 – 3°--.

Signed and Sealed this

First Day of May, 2001

Attest:

NICHOLAS P. GODICI

Attesting Officer      Acting Director of the United States Patent and Trademark Office